United States Patent
Krulik et al.

(10) Patent No.: US 6,613,230 B2
(45) Date of Patent: Sep. 2, 2003

(54) METHOD FOR SIMULTANEOUS REMOVAL OF ARSENIC AND FLUORIDE FROM AQUEOUS SOLUTIONS

(75) Inventors: Gerald A. Krulik, San Clemente, CA (US); Paul H. Dick, San Jose, CA (US); Josh H. Golden, Santa Cruz, CA (US); Jay Jung, Sunnyvale, CA (US); Gennadiy Sverdlov, Castro Valley, CA (US)

(73) Assignee: Ionics, Incorporated, Watertown, MA (US)

( * ) Notice: Subject to any disclaimer, the term of this patent is extended or adjusted under 35 U.S.C. 154(b) by 0 days.

(21) Appl. No.: 09/894,229

(22) Filed: Jun. 27, 2001

(65) Prior Publication Data

US 2002/0113023 A1 Aug. 22, 2002

Related U.S. Application Data

(60) Provisional application No. 60/216,837, filed on Jul. 7, 2000.

(51) Int. Cl.$^7$ .................................................. C02F 1/54
(52) U.S. Cl. .................... 210/638; 210/639; 210/651; 210/724; 210/725; 210/726; 210/727; 210/734; 210/735; 210/736; 210/911; 210/915
(58) Field of Search ............................... 210/638, 639, 210/651, 667, 666, 721, 724, 725, 726, 727, 734, 735, 736, 911, 915

(56) References Cited

U.S. PATENT DOCUMENTS

| 4,145,282 A | 3/1979 | Bruckenstein |
| 5,043,072 A | 8/1991 | Hitotsuyanagi et al. |
| 5,368,703 A | 11/1994 | Brewster |
| 5,403,495 A | 4/1995 | Kust et al. |
| 5,750,033 A | 5/1998 | Ikeda et al. |
| 5,824,227 A | 10/1998 | Cargnel et al. |
| 5,910,251 A | 6/1999 | Allen et al. |
| 6,027,649 A | 2/2000 | Benedek et al. |
| 6,245,121 B1 * | 6/2001 | Lamy et al. ................ 71/1 |
| 6,428,705 B1 * | 8/2002 | Allen et al. ................ 210/638 |

OTHER PUBLICATIONS

Banerjee, K. et al., "A Treatment Process For Removal Of Mixed Inorganic And Organic Arsenic Species From Groundwater", Environmental Progress, vol. 18, No. 4, 1999, pp 280–284.

* cited by examiner

Primary Examiner—Peter A. Hruskoci

(57) ABSTRACT

A method of removing arsenic and fluoride from aqueous solutions in the same process is provided. Specifically, the pH of the aqueous solution is adjusted to a pH in the range of about 5 to 8. A combination of calcium salts, and ferric or aluminum salts are added to form insoluble arsenic and fluoride bearing solids. The solids are then removed from the aqueous solution.

17 Claims, 4 Drawing Sheets

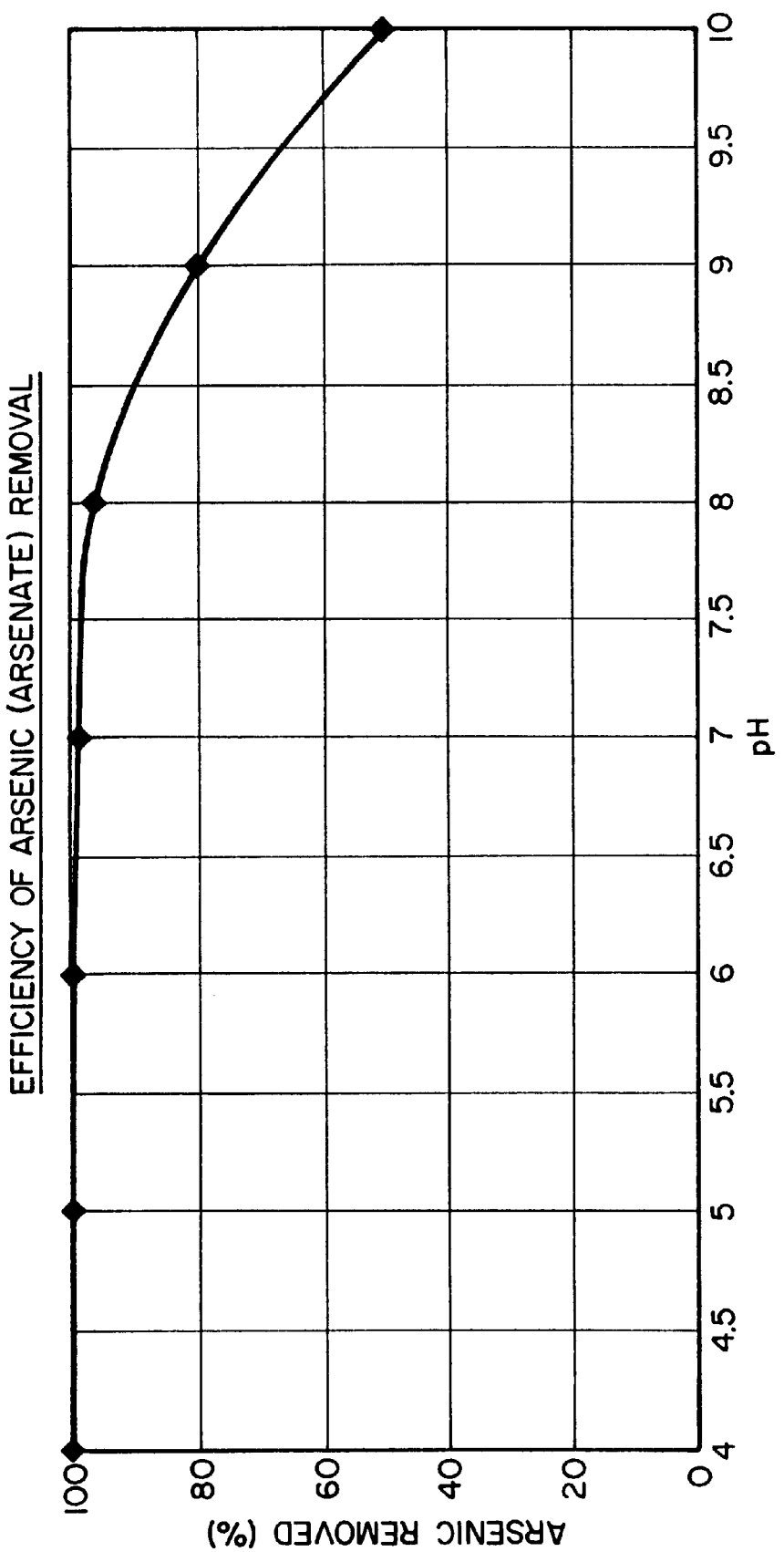
FIG_1

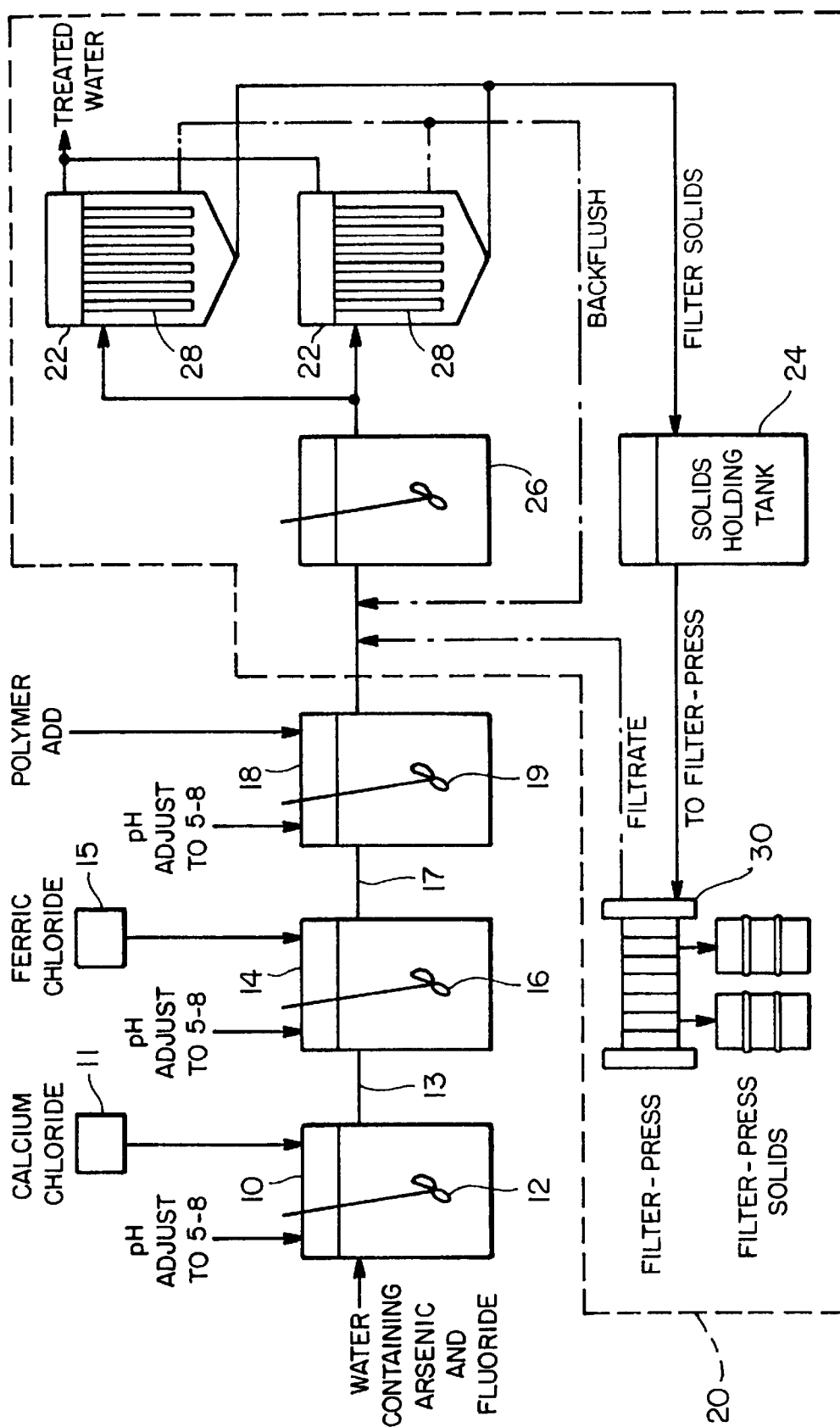
FIG_2

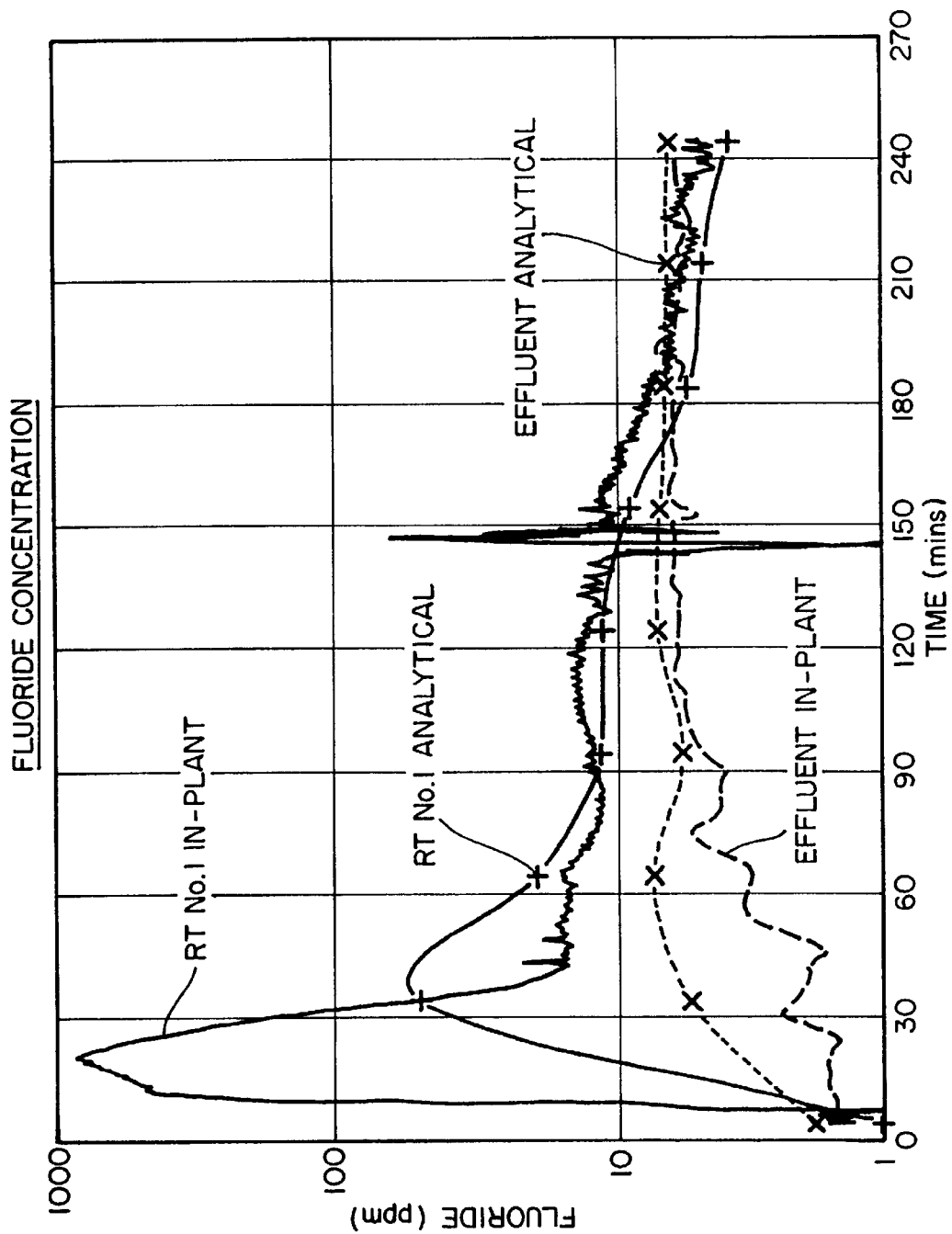
FIG_3

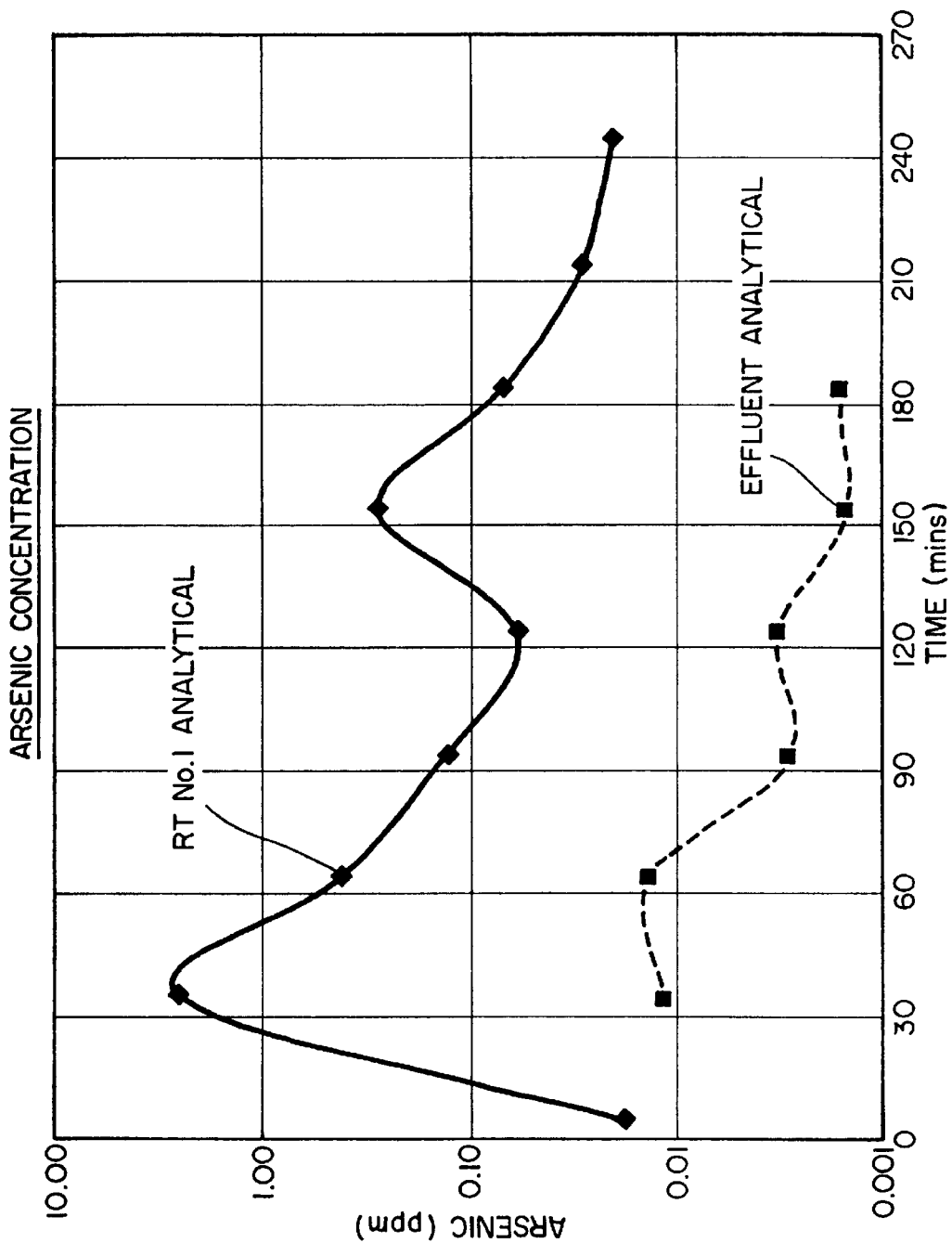

METHOD FOR SIMULTANEOUS REMOVAL OF ARSENIC AND FLUORIDE FROM AQUEOUS SOLUTIONS

CROSS REFERENCE TO RELATED APPLICATIONS

This application claims the benefit of U.S. provisional patent application serial No. 60/216,837, filed Jul. 7, 2000. This application is related to U.S. patent application Ser. No. 09/894,228
entitled "System and Method for Removal of Arsenic from Aqueous Solutions") which is filed simultaneously herewith, and the disclosure of which is hereby incorporated by reference in its entirety.

FIELD OF THE INVENTION

The present invention relates generally to a system and method for removal of arsenic and fluoride from aqueous solutions, such as drinking water or wastewaters. More specifically, the present invention provides an enhanced system and method of simultaneously removing arsenic and fluoride from aqueous solutions using pretreatment with certain salts and maintaining the solution at certain pH ranges to assist removal of the arsenic and fluoride.

BACKGROUND OF THE INVENTION

Arsenic bearing aqueous solutions, such as wastewaters, are obtained from a variety of industries including agriculture, mining, semiconductor, and petroleum. Other sources of arsenic bearing surface and groundwaters include natural erosion processes and water obtained from wells. Recent studies on the carcinogenic properties of arsenic (As) have raised concern about the concentration of As in wastewater and drinking water in the US and worldwide. It has been recognized that many potable water sources are contaminated with unacceptable levels of arsenic and may represent a serious health risk.

Arsenic in drinking water is designated as a priority contaminant in the United States under the 1986 Safe Drinking Water Act and amendments thereto. Since 1974, the maximum contaminant level (MCL) for arsenic imposed by the United States Environmental Protection Agency (EPA) is 50 parts per billion (ppb) or ($\mu$g/L). As a result of more recent findings pertaining to health risks associated with populations exposed to high concentrations of arsenic in drinking water, the EPA recommends lowering the MCL are arsenic from 50 ppb to 2 ppb. It is expected that in the United States alone, more than 12,000 public water utilities would fail to meet the more stringent proposed arsenic standard. One estimate places the cost of compliance with the proposed MCL standard of 2 ppb to be in excess of $5 billion dollars a year.

The number of private wells in the United States fail to meet the existing MCL for arsenic of 50 ppb, or the proposed MCL of 2 ppb, is unknown. It is believed that in many areas of the United States, many thousand of private wells produce drinking water that is contaminated with arsenic, thus causing potential, serious health risks for the households that depend on this self-produced water.

Further, regionally high arsenic contamination in drinking water is a global problem. In West Bengal, India, for example, an estimated 200,000 people currently suffer from arsenic-induced skin lesions, some of which have advanced to pre-cancerous hyperkeratoses. Accordingly, systems and methods that remove arsenic from aqueous solutions such as drinking water and/or wastewaters are of high importance.

Another significant problem is the presence of fluoride in aqueous solutions, such as drinking water and/or wastewaters. Exposure to fluoride at a concentration of above 1 ppm is toxic to humans. Additionally, fluoride-bearing waters can have a deleterious effect on plants and wildlife.

Industrial processes, especially those used in the manufacture of semiconductors, are a source of wastewater containing both fluoride and arsenic. In particular, devices made from gallium arsenide often used in the telecommunications industry are a significant source of soluble arsenic in wastewater. Ion implantation of arsenic atoms in semiconductor substrates is another source. Fluoride containing chemicals are often used to etch substrates, and to clean materials and the associated processing equipment, both of which lead to fluoride in the wastewaters.

The arsenic atom occurs in four valence states (also called oxidation states); namely, −3, 0, +3 and +5. Under standard conditions, the +3 and +5 valence states are respectively found as $AsO_3^{-3}$ (arsenite) and $AsO_4^{-3}$ (arsenate) ions. For effective arsenic removal by coagulation processes, arsenic should be in the +5 oxidation state, preferably in the form of arsenate. Arsenite is partially removed by techniques such as absorption and coagulation, but the mechanism is less effective because its main form, arsenious acid ($H_3AsO_3$), is a weak acid having a pKa1 of about 9.23), and remains unionized at pH values where removal via absorption occurs most effectively; i.e., in the range of about 5 to 8. In contrast, o-arsenic acid ($H_3AsO_4$, arsenic in the 5+ oxidation state), is a strong acid (having a pKa1 of about 2.20), and is in an ionized form starting from a pH of approximately 2. The negatively charged form is most effectively absorbed and coagulated.

Various prior art techniques have been employed to remove arsenic from wastewaters. For example, techniques such as co-precipitation, alumina adsorption, and classical ion exchange with anion resins have been used. Such techniques have achieved limited success and are limited to a removal efficiency of only about 95%. Newer techniques have been developed, for example, U.S. Pat. No. 5,368,703 discloses the use of an electrochemical cell which electrochemically generates ferrous ions. A mild oxidizing condition is created by the addition of peroxide which oxidizes the ferrous ions to ferric so that ferric hydroxide is formed. Ferric hydroxide is then used to remove the arsenic. Another prior art technique is described in U.S. Pat. No. 5,908,557 where trivalent arsenic is oxidized to pentavalent arsenic and then removed by a N-alkyl pyridinium containing adsorption medium. Such newer techniques may provide an improvement in the removal efficiency, but such techniques are cumbersome, require specialized equipment and/or specialty chemicals, and are not easily installed or operated, particularly for private well treatment.

Techniques for removing fluoride include precipitating fluoride using calcium and other compounds in single or multiple stage processes, such as that described in U.S. Pat. Nos. 4,145,282, 5,043,072 and 5,403,495. Such techniques vary in the removal efficiency, and do not address the removal of fluoride together with the removal of arsenic.

Accordingly, it would be highly desirable to provide a system and method which is capable of removing both fluoride and arsenic simultaneously from aqueous solutions, in particular from drinking water and industrial wastewaters, to safe levels. It would be further desirable for such a system and method to be flexible and sufficiently robust in order to address the diverse requirements of industry, large municipal water utilities, private wells, and waters in both developed and undeveloped countries.

SUMMARY OF THE INVENTION

Accordingly, it is an object of the present invention to provide an improved system and method for removing arsenic and fluoride simultaneously from aqueous solutions, in particular drinking water and wastewaters. More specifically, the inventor has discovered a new system and method of simultaneously removing arsenic and fluoride from aqueous solutions using pretreatment with certain salts and maintaining the aqueous solution at certain pH ranges.

In general, the present invention provides a method and system of removing arsenic and fluoride from an aqueous solution including arsenic in the +5 oxidation state, (the +3 oxidation state may also be present) and fluoride (free fluoride anion) characterized in that the aqueous solution is treated with a combination of calcium salts and then ferric or aluminum salts at a pH in the range of 5 to 8, to form arsenic and fluoride bearing precipitates or solids. The solids are then filtered thereby removing the arsenic and fluoride from the aqueous solution.

In another aspect, the present invention provides a method and system of removing arsenic and fluoride simultaneously from an aqueous solution, comprising the steps of: providing an aqueous solution including arsenic in the form of arsenate ions and fluoride. The pH of the aqueous solution is adjusted to a pH in the range of about 5 to 8. At a pH above 8 the effectiveness of the arsenic removal is significantly reduced. Calcium salts are added to the aqueous solution to promote precipitation of the fluoride to form fluoride bearing particles or floc. Ferric or aluminum based salts are then added to the aqueous solution. The ferric or aluminum based salts form a metal hydroxide floc or suspension which absorbs both the arsenate ions and the fluoride bearing particles to form arsenic and fluoride bearing solids. The arsenic and fluoride bearing solids are then removed from the aqueous solution.

In another aspect of the present invention, a system is provided, comprising a first reaction tank for receiving the aqueous solution including arsenic and fluoride. The pH of the aqueous solution is adjusted to be in a range of 5 to 8, and a first injection device is coupled to the first reaction tank to inject calcium salts into the aqueous solution. A first mixer is preferably coupled to the first reaction tank for mixing the aqueous solution to promote precipitation of the fluoride to form fluoride bearing particles. A second reaction tank is provided for receiving the aqueous solution from the first reaction tank wherein the pH of the aqueous solution is again adjusted as necessary to maintain the pH in the range of about 5 to 8. A second injection device is coupled to the second reaction tank to inject ferric or aluminum based salts into the aqueous solution. Preferably a second mixer is coupled to the second reaction tank to mix the aqueous solution and salts, and a metal hydroxide floc or suspension is formed which absorbs both the arsenic ions arsenic and the fluoride bearing particles to form arsenic and fluoride bearing solids. A filtration system is provided to remove the solids and includes one or more filter vessels having one or more filter membranes arranged in a tubular sock configuration and placed over a slotted tube, and one or more settling tanks.

BRIEF DESCRIPTION OF THE DRAWINGS

Other objects and advantages of the present invention will become apparent upon reading the detailed description of the invention and the appended claims provided below, and upon reference to the drawings, in which:

FIG. 1 is a graph showing the percentage of adsorption of arsenate and arsenite as a function of pH.

FIG. 2 is a block diagram of one example of a treatment system in accordance with the system and method of the present invention.

FIG. 3 is a graph showing fluoride concentrations in accordance with the present invention.

FIG. 4 is a graph illustrating arsenic concentrations according to the present invention.

DETAILED DESCRIPTION OF THE INVENTION

The inventor has discovered a new system and method which employs treatment with certain salts in a selected pH range to remove arsenic and fluoride simultaneously from aqueous solutions such as drinking water or wastewater. The simultaneous removal of arsenic and fluoride as the term is used in the present invention means that arsenic and fluoride are removed in the same process, and that separate processes are not needed.

In general, the present invention provides a system and method of removing arsenic and fluoride from an aqueous solution including arsenic in the +5 oxidation state, (the +3 oxidation state may also be present) and fluoride ions (as free fluoride anion) characterized in that the aqueous solution is treated with a combination of calcium salts and then ferric or aluminum salts at a pH in the range of 5 to 8, to form arsenic and fluoride bearing solids. The solids are then filtered thereby removing the arsenic and fluoride solids from the aqueous solution. More specifically, arsenic and fluoride are removed from an aqueous solution including arsenic in the form of arsenate ions (arsenic in the +5 oxidation state) and fluoride ions. In one embodiment, the arsenic is provided primarily in the +5 oxidation state by treatment with a pre-oxidation step. Under standard conditions, arsenic in the +3 and +5 oxidation states (also referred to as valence states) are commonly found as $AsO_3^{3-}$ (arsenite) and $AsO_4^{3-}$ (arsenate). For more effective removal of arsenic using coagulation processes it is preferred that the arsenic be primarily present in the +5 oxidation state.

To provide the +5 oxidation state, the aqueous solution is preferably treated in a pre-oxidation step. Any suitable oxidation treatment may be employed in the pre-oxidation step. Suitable oxidation treatments include, but are not limited to: ozone treatment, exposure to U.V., bleaching, treatment with oxidizing chemicals or agents such as permanganate, and the like. Alternatively, the pre-oxidation step may be performed using the method described in co-pending U.S. patent application Ser. No. 09/894,527 and provisional patent application Serial No. 60/216,759 filed Jul. 7, 2000 (Attorney Docket No. P-68635/AJT/MSS), the entire disclosures of which are hereby incorporated by reference. Specifically, as further described therein, the aqueous solution is treated with a combination of hydrogen peroxide and ferric or ferrous salts at a pH in the range of about 3 to 5. The combination of the iron salts and peroxide in the selected pH range promotes oxidation of the arsenic ions in the +3 state to the +5 state. While this pre-oxidation step is preferred, it should be understood to those of ordinary skill in the art that the present invention may be carried out without the pre-oxidation step.

Following the pre-oxidation step, or alternatively where the pre-oxidation step is not used, the pH of the aqueous solution is adjusted to a pH in the range of about 5 to 8 and calcium salts are added to the aqueous solution to promote precipitation of the fluoride ions to form fluoride bearing particles. Next, ferric or aluminum based salts are then added into the aqueous solution. The ferric or aluminum based salts form a metal hydroxide floc or suspension which absorbs both the arsenate ions and the fluoride bearing particles to form an insoluble arsenic and fluoride bearing solids. The pH of the aqueous solution is adjusted as necessary using conventional means to maintain a pH in the range of about 5 to 8 during the process. The arsenic and fluoride bearing solids are then removed from the aqueous solution preferably by filtration as described in detail below. At a pH of above 8, the effectiveness of the arsenic removal is significantly reduced.

In the preferred embodiment, an additional step is added where coagulants and/or flocculants are added to the aqueous solution to aid in the precipitation of the arsenic and fluoride bearing solids. Any suitable coagulant and/or flocculant may be used with the present invention. Preferably the coagulant and/or flocculant will be a medium molecular weight organic polymer, such as that having a molecular weight in the range of about 2,500 to 500,000.

The initial concentration of the fluoride in the aqueous solution will vary greatly and typically will be in the range of about 1 to 5,000 ppm. The initial concentration of the arsenic in the aqueous solution will also vary greatly and typically will be in the range of about 0.010 to 500 ppm. According to the method of the present invention the pH of the aqueous solution is adjusted to a pH in the range of about 5 to 8. A pH of about 7.5 is most preferred. A calcium salt is added to the aqueous solution. Preferably the calcium salt is selected from the group of calcium chloride, calcium hydroxide, and calcium carbonate, with calcium chloride being most preferred. The calcium salts may be in the form of a solution, and are added to the aqueous solution at a concentration such that the mole ratio of calcium to fluoride is in the range of about 1 to 2 mole calcium to 2 mole fluoride. Thus, the actual amount of calcium added to the aqueous solution will vary depending on the concentration of the fluoride in the aqueous solution.

The addition of the calcium salts to the aqueous solution in the recited pH range promotes precipitation of the fluoride to form insoluble fluospar or calcium difluoride particles. Preferably, this reaction is allowed to occur for a sufficient period of time to allow for precipitation of the fluoride to take place. The time will vary depending on the initial concentration of the fluoride present in the aqueous solution and the flow rate of the aqueous solution, and generally will be in the range of about 5 minutes to 1 hour, with a time of at least 10 minutes being most preferred. Preferably, substantially all of the fluoride is precipitated out of solution; however, as described below additional coagulant and/or flocculants can be added to aid in more complete precipitation of both the fluoride and arsenic particles.

To remove the arsenic ions, ferric or aluminum based salts are next added to the aqueous solution. The calcium fluoride particles are engulfed and absorbed by the hydroxide form of the aluminum or iron based coagulant, which also serves as a substrate for arsenic absorption and surface adsorption. The pH of the aqueous solution is monitored by conventional means and is adjusted as necessary to maintain a pH in the range of about 5 to 8, with a pH of about 7.5 being most preferred. Any ferric or aluminum based salt that forms a metal hydroxide floc or suspension at the recited pH range may be used, such as chlorides or sulfates. For example, ferric salts suitable for use with the present invention may be selected from the group of ferric chloride, ferric nitrate, ferric ammonium sulfate, ferric ammonium chloride, ferric hydroxide, and ferric oxide. Ferric salts are preferred because they form a metal hydroxide floc that absorbs arsenic over a wider pH range than aluminum salts. Ferric chloride is most preferred.

FIG. 1 is an adsorption curve showing the percentage of adsorption of arsenic (arsenate) as a function of the pH. As can be seen from FIG. 1, the method of the present invention aims to promote efficient removal of arsenate by selecting the pH to be in the range of about 5 to 8, with a pH of about 7.5 being most preferred. Additionally, at a pH greater than 8 the effectiveness of arsenic removal is significantly reduced. At a pH above 8, charge reversal can occur, causing the arsenic to be released from the metal hydroxide floc.

The ferric or aluminum salts may be in the form of a solution. As stated above, the addition of the ferric or aluminum salts to the aqueous solution in the recited pH range promotes the formation of a metal hydroxide floc or suspension which absorbs both the arsenic, primarily in the form of arsenate ions, and the calcium particles (i.e. fluospar or calcium difluoride) formed in the previous step. Preferably, this reaction is allowed to occur for a sufficient period of time to allow for absorptions of the arsenate ions and fluoride particles to take place. The time will vary depending on the initial concentration of the fluoride and arsenic present in the aqueous solution and the flow rate of the aqueous solution, and generally will be in the range of about 5 minutes to 1 hour, with a time of at least 10 minutes being most preferred. Preferably, substantially all of the arsenate ions and fluoride particles are absorbed by the metal hydroxide floc, thereby forming fluoride and arsenic bearing solids; however, additional coagulant and/or flocculants can be added.

In the preferred embodiment, additional coagulants and/or flocculants are added to the aqueous solution to aid more complete precipitation prior to filtration. The coagulants and/or flocculants are low to medium molecular weight organic polymers, and preferably have a molecular weight in the range of about 2,500 to 500,000 g/mole. Examples of suitable coagulants and/or flocculants include, but are not limited to, EPI-DMA, DADMAC and copolymers of poly (acrylamide) and DADMAC. The coagulants and/or flocculants are added in an amount sufficient to aid precipitation, and are generally present in the aqueous solution in a concentration of 3 to 300 ppm.

Once the fluoride and arsenic bearing solids are formed, they are removed from the aqueous solution via filtration techniques as further described below. The method of the present invention is capable of removing substantially all of the fluoride and arsenic in the aqueous solution, and particularly the final concentration of the arsenic after the inventive treatment is generally equal to or less than about 5 ppb, and preferably equal to or less than about 2 ppb, and the fluoride concentration is generally equal to or less than about 10 ppm, and preferably equal to or less than about 2 ppm.

The method of the present invention may be carried out with any suitable water treatment system and is not limited by any particular apparatus or system, however, the method is preferably carried out in the system of the present invention as described below. One example of the system of the present invention is illustrated in FIG. 2. FIG. 2 shows an arsenic and fluoride removal system, generally comprised of one or more reaction tanks, associated mixers and a filtration system. Preferably, the filtration system is of the type described in U.S. Pat. Nos. 5,871,648 and 5,904,853, the entire disclosures of which are hereby incorporated by reference. Specifically, the arsenic and fluoride containing aqueous solution is fed to a first reaction tank 10. The pH of the solution in the first reaction tank is adjusted to pH in the range of about 5 to 8 using a conventional pH adjustment device (not shown), and a chloride salt, such as calcium chloride, is added to the tank 10 via a first injection device 11. The first injection device 11 is any suitable chemical delivery unit. The calcium salts are added until a concentration in mole ratio of calcium to fluoride in the aqueous solution of about 1 to 2 moles calcium to 2 mole fluoride is reached. Preferably, the first injection device 11, such as a fluoride ion specific electrode (ISE) which includes a process control features which provide for real time monitoring of the fluoride concentration in the first tank.

The solution is agitated with mixer 12 to promote mixing of the components. The solution is mixed with mixer 12 for a period of time to allow for substantially complete precipitation of the fluoride particles. The time of reaction will vary depending on the size of the reaction tank 10 and the initial fluoride concentration of the aqueous solution, and will preferably be at least about 10 minutes.

The solution is then fed to a second reaction tank 14 via delivery line 13. The pH of the aqueous solution is monitored and adjusted as necessary to maintain the pH of the aqueous solution in the range of about 5 to 8 using a conventional pH adjustment device. Ferric or aluminum salts, such as ferric sulfate or ferric chloride, are added to the second reaction tank 14 via a second injection device 15, and the solution is agitated with mixer 16 to ensure mixing of the components. Alternatively, the ferric or aluminum salts may be added to the solution via an inline mixer (not shown) placed in the delivery line 13. The salts may be in solid or preferably solution form. The concentration of the ferric or aluminum salts in the aqueous solution will depend strongly on the amount of arsenic and fluoride present in the solution, and preferably is in the general range of about 10 to 1,000 ppm.

The solution is mixed with mixer 16 for a period of time to allow the solution sufficient contact time with the metal hydroxide floc. The time will typically be at least about 10 minutes.

Once the metal hydroxide is formed, the solution is fed to a third reaction tank 18 via delivery line 17. The pH of the aqueous solution is again adjusted if necessary to maintain the pH of the solution in the range of about 5 to 8. The solution is mixed with mixer 19 to promote good mixing of the components. At this pH range, the insoluble calcium particles and the arsenic ions are absorbed onto the metal hydroxide floc to form arsenic and fluoride bearing solids. The reaction is allowed to occur for a period of time. Preferably, the size of the third reaction tank 18 should be such that the residence time of the aqueous solution is 5 minutes or greater, with about 10 minutes being most preferred. In the preferred embodiment, to assist in the formation of arsenic and fluoride bearing solids, the coagulants and/or flocculants may be added to the feed tank 18.

Once formed, the arsenic and fluoride bearing solids are fed by pump (not shown) or gravity into a filtration system 20. Any suitable filtration system may be used. FIG. 2 illustrates the preferred embodiment of the filtration system. The filtration system 20 in FIG. 2 is comprised generally of a membrane filtration system such as a microfiltration system described in greater detail in U.S. Pat. Nos. 5,871,648 and 5,904,853, the entire disclosures of which is hereby incorporated by reference. In this example, the filtration system generally includes one or more filter or microfiltration tanks 22 and a settling or sludge holding tank 24. A backflush tank 26 may be used, and is preferably placed prior to the filter tanks 22. The filter tank 22 is operated in two modes; namely, a filter tank operating mode and the filter tank backflush mode. The filter tank 22 generally includes a micro filtration membrane in a tubular "sock" configuration. The membrane sock is placed over a slotted tube to prevent the sock from collapsing during use. The membrane material is commercially available from a variety of sources, and preferably has a pore size in the range of 0.5 to 10 microns, with a pore size of 1 micron being most preferred.

During the operation mode, the arsenic and fluoride bearing solids are dewatered and filtered from the aqueous solution. The aqueous solution is pumped from the filter vessel through the membrane, and as the aqueous solution passes through the membrane, the particles do not pass through, and instead build up on the outside of the membrane surface. The "clean" aqueous solution overflows out of the top of the filter tank for discharge or recycling. The clean aqueous solution is substantially free of arsenic, and contains an arsenic concentration of equal to or less than 10 ppb, and more preferably equal to or less than 2 ppb; and substantially free of fluoride at a concentration of equal to or less than 10 ppm and more preferably equal to or less than 2 ppm.

More specifically, the filter tank 22 is preferably equipped with an array of microfiltration membranes 28. Preferably, the microfiltration membranes are comprised of a tubular "sock" configuration to maximize surface area. The membrane sock is placed over a slotted support tube to prevent the sock from collapsing during use. In order to achieve high flow rates and flux values, a number of membranes or membrane modules, each containing a number of individual filter socks, may be used. The microfiltration membranes preferably have a pore size in the range from 0.5 $\mu$m to 10 $\mu$m microns, and preferably from 0.5 $\mu$m to 1.0 $\mu$m. It has been found that the treated wastewater flux through 0.5 to 1 $\mu$m microfiltration membranes can be in the range from about 200 gal/ft$^2$/day (GFD) to 1500 GFD, with 800 GFD being a desired flux. Further, the system flow rate can range from about 10 to 10,000 gal/min.

The microfiltration membranes are preferably provided in cassette or module or in a preformed plate containing the membrane array. In either case, the membranes are conveniently installed or removed from the top by unscrewing a collar fitting. Alternatively, the entire cassette or plate may be removed for servicing. The microfiltration membranes provide a positive particle separation in a high recovery dead head filtration array. This dead head filtration operates effectively at low pressures (3 psi to 25 psi, preferably 5 psi to 10 psi) and high flow rates, allowing a one pass treatment with up to 99.9% discharge of the supplied water, and wherein the pressure difference across the microfiltration membranes do not exceed about 25 psi. Solids which accumulate on the membrane surface during filtration are periodically back-flushed away (and gravity settled) from the membrane surface to ensure a continuously clean filtration media. Currently, the preferred filter socks useful with the present invention contain a Teflon® coating on a poly (propylene) or poly(ethylene) felt backing material. Such socks are available from W. L. Gore. Another presently preferred filter sock manufactured by National Filter Media, Salt Lake City, Utah, consists of a polypropylene woven membrane bonded to a poly(propylene) or poly(ethylene) felt backing. Because the membranes are simple and inexpensive, some operations deem it more cost-effective to replace the membrane socks instead of cleaning contaminants from the membrane. However, it should be noted that the membranes are very resistant to chemical attack from acids, alkalis, reducing agents, and some oxidizing agents. Descaling of the membranes is achieved by acid washing, while removal of biofouling may be accomplished by treatment with hydrogen peroxide, dilute bleach, or other suitable agents.

To remove the arsenic and fluoride bearing solids from the membrane surface and the filter vessel, the filter tank 22 is placed in backflush mode. The membranes 28 are periodically backflushed to keep the flow rate high through the system. Solids are preferably removed from the membrane surface by periodically backflushing the microfiltration membranes and draining the filter tank 22 within which the membranes 28 are located. Preferably, the backflush is initiated when the pressure at the membrane 28 builds to approximately 6 psi. The periodic, short duration back flush removes any buildup of contaminants from the walls of the microfiltration membrane socks. Backflush is achieved but is not restricted to a gravity scheme, i.e., one in which a valve is opened and the 1 to 2 feet of water headspace above the filter array provides the force that sloughs off the filter cake. The dislodged solid material within the filter tank 22 may then be transferred into the solids holding tank 24 for further processing of the solids. The microfiltration as described is fully automated and can run 24 hours, seven days a week, with minimal input from the operator. The system may be completely automated using process logic control (PLC) which can communicate with supervisory and control data acquisition systems (SCADA). Simple and rugged hardware continuously monitors the characteristics of the influent and effluents and adjusts the chemical feed as needed. Examples of parameters automatically monitored include pH, turbidity, oxidation reduction potential, particle zeta potential, and metal contaminant concentration. Process development and fine-tuning is achieved by continuous monitoring of the process parameters followed by control adjustment by known techniques. In the backflush mode, the flow of the system is reversed where water from the headspace above the filter array flows in reverse. This is achieved by opening a valve on the filter tank 22. The particles or sludge settles on the bottom of the filter tank 22, and then are pumped or gravity feed to the solids holding tank 24 and removed. A filter press 30 may be used to provide further dewatering of the particles, if desired. It is important to note that while one type of treatment system has been described, the method of the present invention may be carried out in a wide number of different types of treatment systems, such as for example gravity settling and cross-flow filtration systems.

Experimental

The following prospective example is provided for illustration purposes only and is not intended to limit the invention in any way.

EXAMPLE 1

A gallium arsenide solar cell manufacturing facility produces a mixed aqueous waste stream consisting of arsenic and acidic fluoride. The source of the arsenic is from HF etching processes and an arsine gas scrubber. The concentration of the arsenic in the wastewater ranges from zero to 2,000 ppm. Fluoride concentration ranges from 0 to 500 ppm. The flow rate of the wastewater ranges from 20 to 50 gallons/minute. According to the present invention, in this wastewater treatment system, arsenic is removed continually to below the discharge limit of 50 ppb, by ferric hydroxide absorption between pH 5 and 8. Fluoride is removed to less than 10 ppm by precipitation as fluorspar ($CaF_2$), on demand, as per fluoride ion specific electrode (ISE) sensor readings. The pressure of the filtration system, specifically the pressure across the membrane filters, ranges from 3 to 10 psig, with 5 psig being the average. The average flux in gallons/$ft^2$ membrane/day (GFD) is estimated to be 800 GFD. The high flow rate, low pressure filtration system is preferably designed for automatic operation and preferably operates 24 hours per day with minimal input from the operator. Control and troubleshooting can be done on-site, or via modem from anywhere in the world.

In a typical embodiment, wastewater containing both dissolved fluoride and arsenic is introduced into a preholding tank (not shown), and the wastewater pH is adjusted to approximately 8. After gross pH adjustment, the wastewater is introduced into a first reaction tank 10, and calcium chloride solution (35% of bulk solution of reagent) is injected at a rate so that the mole ratio of calcium to fluoride is maintained in the range of 1 to 2 mole calcium to 2 mole fluoride. Calcium dosage depends on real time monitoring of the fluoride concentration preferably via ISE in the first reaction tank. Injection of the calcium solution can occur via inline mixer or directly into the tank 10. The tank 10 is well stirred at approximately 50 RPM and the pH is maintained between 5 and 8 with 7 being preferred. The resulting fluorspar precipitate and aqueous solution is then transferred to the second reaction tank 14, where the solution containing the aqueous arsenic and calcium fluoride precipitate is treated with 35% ferric chloride solution, which is preferably continuously injected. The pH is maintained at a range of 5 to 8, and care is taken so that the pH does not exceed 8.0, so that the absorbed arsenic on the floc particles does not desorb due to surface charge reversal. The ferric hydroxide floc particles thus obtained contain both calcium fluoride precipitate and arsenic. To enhance the coagulation and filterability of the floc, an EPI-DMA cationic polymer of approximately 250,000 molecular weight is introduced in the third reaction tank 18. The large and easily filtered particles are then subjected to microfiltration system 20, at preferably 5 psig differential pressure.

EXAMPLE 2

Two chemical dumps occurred simultaneously in the system. First, a 5 gallon carboy containing 13.87 mL of arsenic solution was dropped into the system, followed by a 1 gallon drop that contained 1.855 L of fluoride solution. First, the hydraulic dilution effect was both calculated and measured for comparison to treatment efficiency. This amounts to a theoretical concentration maximum in reaction tank #1 of 10.8 ppm of arsenic and 1441 ppm of fluoride. After thirty minutes, theoretical concentrations without treatment in the filter tanks (dilution only) are 286 ppb of arsenic and 38.2 ppm of fluoride; after sixty minutes, 250 ppb of arsenic and 33.4 ppm of fluoride; after ninety minutes, 104 ppb of arsenic and 13.9 ppm fluoride; and after 120 minutes, 34.4 ppb of arsenic and 4.60 ppm of fluoride.

The actual maximum inlet concentration was 863.7 ppm of fluoride after 12 minutes. At the first analytical test, after a half hour, the inlet arsenic concentration was 2.4 ppm. The actual maximum system outlet concentration of fluoride was 6.06 ppm, an hour and 48 minutes after the dump. The actual maximum arsenic concentration was 13.6 ppb, during the second test, after one hour of testing. FIGS. 3 and 4 graphically illustrate the fluoride and arsenic concentration as a function of time, respectively, according to the examples of the present invention.

The system ran continuously for four hours with chemical treatment to remove the arsenic and fluoride. During the dump, the average flow rate into the system was 15.22 gpm. The average dosage rate for the calcium chloride was 52.79 ml/min; the average rate for sodium aluminate was 9.58 ml/min; the average rate for ferric chloride was 1.41 mL/min; and the average rate for EPI-DMA was 1.41 mL/min. The dosage concentration of calcium chloride is 30%; the dosage concentration for ferric chloride is 35%; the dosage concentration of EPI-DMA is 5%; and the dosage concentration for sodium aluminate is 38%. The data in Table 1 below shows that both dilution and chemical treatment according to the present invention reduce the arsenic and fluoride to acceptable levels.

TABLE 1

|  | Arsenic | | Fluoride | |
| --- | --- | --- | --- | --- |
|  | Dilution | Treatment and Dilution | Dilution | Treatment and Dilution |
| Theo. Max. Inlet Concentration (ppm) | 10.8 | — | 1441 | — |
| Theo. Max. Outlet Concentration (ppm) | 0.323 | — | 43.2 | — |
| Act. Max Inlet Concentration (ppm) | — | 2.4 | — | 863.7 |
| Act. Max Outlet Concentration (ppm) | — | 0.0136 | — | 6.06 |
| Concentration Reduction | 97.0% | 99.4% | 97.0% | 99.3% |
| Recovery | 0% | 81.1% | 0% | 76.6% |

As taught by the foregoing description and examples, an improved method for removing arsenic and fluoride from aqueous solutions in the same process has been provided by the present invention. The foregoing description of specific embodiments and examples of the invention have been presented for the purpose of illustration and description, and although the invention has been illustrated by certain of the preceding examples, it is not to be construed as being limited thereby. They are not intended to be exhaustive or to limit the invention to the precise forms disclosed, and obviously many modifications, embodiments, and variations are possible in light of the above teaching. It is intended that the scope of the invention encompass the generic area as herein disclosed, and by the claims appended hereto and their equivalents.

I claim:

1. A method of removing arsenic and fluoride from an aqueous solution, characterized in that the aqueous solution is treated with calcium to form fluoride bearing particles and a combination of ferric or aluminum iron salts at a pH in the range of about 5 to 8 to form insoluble arsenic and fluoride bearing solids including said fluoride bearing particles; and removing said solids from the aqueous solution simultaneously reducing the level of arsenic and fluoride in said solution to a desired level by passing the aqueous solution through a microfiltration membrane having a pore size in the range from 0.5 to 10 microns at a flow rate of at least 200 gallons per square foot of membrane per day.

2. The method of claim 1 wherein the pH of the aqueous solution is maintained at about 7.5.

3. The method of claim 1 wherein the calcium salt is calcium chloride.

4. The method of claim 1 wherein the ferric salts are ferric chloride.

5. The method of claim 4 wherein the concentration of ferric salts in the aqueous solution is in the range of about 10 to 1,000 ppm.

6. The method of claim 1 wherein the pH does not exceed 8.

7. The method of claim 1 further comprising the step of: treating said aqueous solution, prior to removing said arsenic and fluoride bearing solids with a coagulant, a flocculant, or a combination thereof, to enhance formation of said solids.

8. The method of claim 7 wherein said coagulants or flocculants are selected from the group of EPI-DMA, DADMAC, copolymers of poly(acrylamide) and DADMAC, and any combination thereof.

9. The method of claim 1 wherein said treatment is carried out for a time of at least about 5 minutes.

10. The method of claim 1 wherein the mole ratio of calcium to fluoride is in the range of about 1 to 2 mole calcium to 2 mole fluoride.

11. A method of removing arsenic and fluoride from an aqueous solution, comprising the steps of:

providing an aqueous solution including arsenic and fluoride;

adjusting the pH of the aqueous solution to a pH in the range of about 5 to 8;

adding calcium salt into the aqueous solution to form fluoride bearing particles;

adding ferric or aluminum salts into the aqueous solution to form a metal hydroxide floc which absorbs both said fluoride particles and arsenic to produce insoluble arsenic and fluoride bearing solids; and removing said arsenic and fluoride bearing solids from the aqueous solution simultaneously reducing the level of arsenic and fluoride in said solution to a desired level by passing the aqueous solution through a microfiltration membrane having a pore size in the range from 0.5 to 10 microns at a flow rate of at least 200 gallons per square foot of membrane per day.

12. The method of claim 11 wherein said ferric salts are selected from the group of: ferric nitrate, ferric chloride, ferric ammonium sulfate, ferric ammonium chloride, ferric hydroxide and ferric oxide.

13. The method of claim 11 wherein said calcium salt is calcium chloride.

14. The method of claim 11 further comprising the step of: treating said aqueous solution, prior to the removing step, with coagulants, flocculants, or a combination thereof, to enhance formation of the arsenic and fluoride bearing solids.

15. The method of claim 11 wherein said method is carried out for a time of at least 5 minutes.

16. The method of claim 11 wherein the mole ratio of calcium to fluoride is in the range of about 1 to 2 mole calcium to 2 mole fluoride.

17. The method of claim 11 wherein the concentration of ferric salts in the aqueous solution is in the range of about 10 to 1,000 ppm.

* * * * *